(12) United States Patent
Ladeira et al.

(10) Patent No.: US 12,494,092 B2
(45) Date of Patent: Dec. 9, 2025

(54) SYSTEM AND METHOD FOR AGRICULTURAL OPERATIONS

(71) Applicant: CNH Industrial America LLC, New Holland, PA (US)

(72) Inventors: Claudio Silva Ladeira, Naperville, IL (US); Daniel Danford, Greendale, WI (US); Douglas Walgren, Naperville, IL (US); Piet Haerens, Koekelare (BE)

(73) Assignee: CNH Industrial America LLC, New Holland, PA (US)

( * ) Notice: Subject to any disclaimer, the term of this patent is extended or adjusted under 35 U.S.C. 154(b) by 206 days.

(21) Appl. No.: 18/216,895

(22) Filed: Jun. 30, 2023

(65) Prior Publication Data
US 2024/0005704 A1   Jan. 4, 2024

Related U.S. Application Data

(60) Provisional application No. 63/357,233, filed on Jun. 30, 2022.

(51) Int. Cl.
*G07C 5/00* (2006.01)
*G07C 5/08* (2006.01)

(52) U.S. Cl.
CPC .......... *G07C 5/008* (2013.01); *G07C 5/0816* (2013.01); *G07C 5/0841* (2013.01)

(58) Field of Classification Search
CPC .... G07C 5/008; G07C 5/0816; G07C 5/0841; H04W 4/44; G06Q 10/20; G06Q 50/02; G06Q 10/0631

USPC .......................................................... 701/50
See application file for complete search history.

(56) References Cited

U.S. PATENT DOCUMENTS

2020/0378088 A1 * 12/2020 Anderson ............ G05D 1/0022

FOREIGN PATENT DOCUMENTS

| JP | 2018-099-111 | * | 6/2018 |
| JP | 2018-099-112 | * | 6/2018 |
| JP | WO-2018116-772 | * | 6/2018 |

* cited by examiner

*Primary Examiner* — Muhammad Shafi
(74) *Attorney, Agent, or Firm* — Dority & Manning, P.A.

(57) ABSTRACT

A fleet operation system includes a remote platform including a server communicatively coupled with a first vehicle and a second vehicle. The server includes an application interface. A first communication interface is operably coupled with the first vehicle. The first communication interface includes a first CAN data bus and a first data network transceiver. A second communication interface is operably coupled with the second vehicle. The second communication interface includes a second CAN data bus and a second data network transceiver. A user computing system is operably coupled with the remote platform. The user computing system is configured to receive the first set of output data and the second set of output data from the application interface.

18 Claims, 3 Drawing Sheets

SYSTEM AND METHOD FOR AGRICULTURAL OPERATIONS

CROSS-REFERENCE TO RELATED APPLICATION

This application claims the benefit of priority to U.S. Provisional Patent Application No. 63/357,233, entitled "SYSTEM AND METHOD FOR AGRICULTURAL OPERATIONS," filed on Jun. 30, 2022.

FIELD OF THE INVENTION

The present disclosure generally relates to agricultural operations and, more particularly, to systems and methods for monitoring agricultural equipment performing various agricultural operations.

BACKGROUND OF THE INVENTION

Large agricultural fleets can operate hundreds of vehicles and manage operations spanning vast amounts of land. In various instances, a centralized control unit may be used to monitor the operation of a large amount of vehicles. Accordingly, systems and methods for operating a fleet operation system would be welcomed in the technology.

BRIEF DESCRIPTION OF THE INVENTION

Aspects and advantages of the invention will be set forth in part in the following description, or may be obvious from the description, or may be learned through practice of the invention.

In some aspects, the present subject matter is directed to a fleet operation system that includes a remote platform comprising a server communicatively coupled with a first vehicle and a second vehicle. The server includes an application interface. A first communication interface is operably coupled with the first vehicle. The first communication interface comprises a first CAN data bus and a first data network transceiver. The first CAN data bus is configured to collect a first set of set of machine data, and the first data network transceiver is configured to transfer a first set of output data to a remote platform. A second communication interface is operably coupled with the second vehicle. The second communication interface comprises a second CAN data bus and a second data network transceiver. The second CAN data bus is configured to collect a second set of machine data and the second data network transceiver is configured to transfer a second set of output data to the remote platform. A user computing system is operably coupled with the remote platform and is configured to receive the first set of output data and the second set of output data from the application interface.

In some aspects, the present subject matter is directed to a method for operating a fleet operation system. The method includes generating a first set of machine data for a first vehicle during an agricultural operation and generating a second set of machine data for a second vehicle during the agricultural operation. The method also includes transmitting a first set of output data that is chosen from the first set of machine data to a remote platform through a first communication interface and transmitting a second set of output data that is chosen from the second set of machine data to the remote platform through a second communication interface. The method further includes receiving a command to transfer all of the first set of output data to a user computing system through an application interface and receiving a command to transfer all of the second set of output data to the user computing system through the application interface. Lastly, the method includes transferring all of the first set of output data and all of the second set of output data to a user computing system through the application interface.

In some aspects, the present subject matter is directed to a fleet operation system that includes a remote platform comprising a server communicatively coupled with a first vehicle and a second vehicle, the server including an application interface. A first communication interface is operably coupled with the first vehicle. The first communication interface comprises a first CAN data bus and a first data network transceiver. The first CAN data bus is configured to collect a first set of machine data, and the first data network transceiver is configured to transfer a first set of output data to the remote platform. A user computing system is operably coupled with the remote platform and configured to select a set of defined data from the first set of output data, and receive the set of defined data from the application interface at intermittent intervals.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
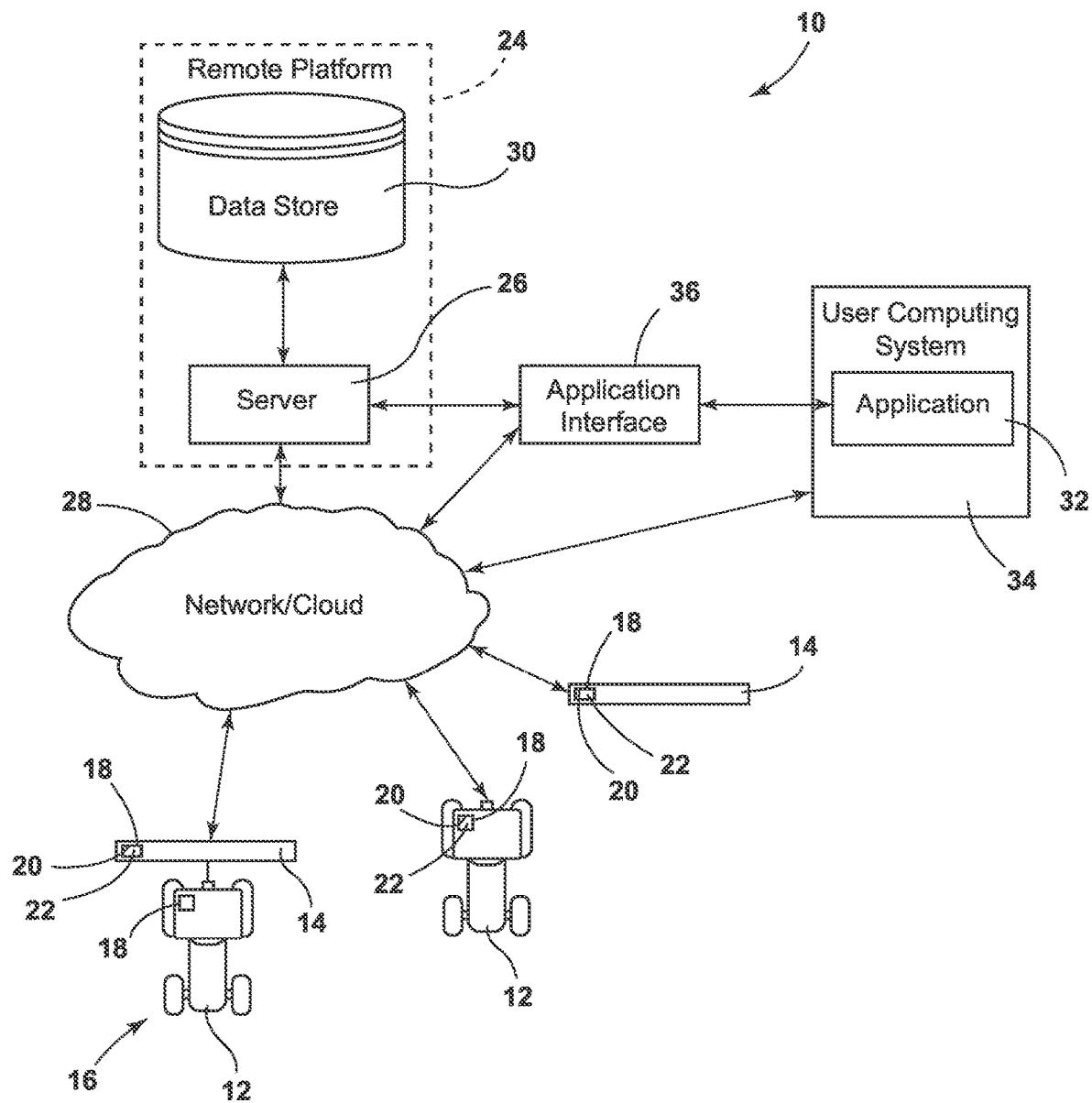
FIG. 1 illustrates a simplified, schematic view of an agricultural fleet operation system in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part can be used with another embodiment to yield a still further embodiment. Thus, it is intended that the present invention covers such modifications and variations as come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein. The terms "upstream" and "downstream" refer to the relative direction with respect to a harvested material within a fluid circuit. For example, "upstream" refers to the direction from which a harvested material flows, and "downstream" refers to the direction to which the harvested material moves. The term "selectively" refers to a component's ability to operate in various states (e.g., an ON state and an OFF state) based on manual and/or automatic control of the component.

Furthermore, any arrangement of components to achieve the same functionality is effectively "associated" such that the functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable, physically interacting components, wirelessly interactable, wirelessly interacting components, logically interacting, and/or logically interactable components.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

As used herein, a "desired foliage ratio" may be an input that is defined by an operator and/or any device. In addition, a "current foliage ratio" may be a detected foliage ratio of the system while the system is operating.

Moreover, the technology of the present application will be described in relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein will be considered exemplary.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

In general, the present subject matter is directed to systems and methods for agricultural operations. In particular, the present subject matter is directed to fleet operation systems and methods for operating a fleet operation system. In various examples, the fleet operation system can include a remote platform that can include a server communicatively coupled with a first vehicle and a second vehicle. The server can include and/or be operably coupled with an application interface.

A first communication interface may be operably coupled with the first vehicle. The first communication interface can include a first CAN data bus and a first data network transceiver. The first CAN data bus can be configured to transmit a first set of machine data to the first data network transceiver, which, in turn, is configured to transfer a first set of output data to a remote platform. A second communication interface is operably coupled with the second vehicle. The second communication interface can include a second CAN data bus and a second data network transceiver. The second CAN data bus can be configured to transmit a second set of machine data to the second data network transceiver, which, in turn, is configured to transfer the second set of output data to the remote platform.

In various examples, a user computing system may be operably coupled with the remote platform. The user computing system may be configured to receive the first set of output data and the second set of output data from the application interface. In various examples, the set of output data can include operational data or conditions, default trouble codes (DTC), and/or data dictionary identifiers (DDI).

Referring now to the drawings, FIG. 1 illustrates a fleet operation system in accordance with various aspects of the present disclosure. In the illustrated example, the fleet operation system 10 includes one or more agricultural vehicles 12 (e.g., tractors), pieces of equipment 14 (e.g., implements that may be operably coupled with or carried by the vehicle 12) to be used with one or more agricultural vehicles 12, or agricultural systems 16 that include vehicles 12 and implements to perform various agricultural operations. The agricultural operations may include tilling, seeding, planting, fertilizing, spraying, harvesting, and the like.

In some embodiments, the vehicle 12 may be a tractor or a support vehicle that does not include equipment 14, such as an implement. In such cases, the vehicle 12 may be configured to attach to a piece of equipment 14 to perform an agricultural operation. In other embodiments, the vehicle 12 may include an implement or attachment for performing an agricultural operation (e.g., a combine). Additionally or alternatively, vehicles 12 and add-on equipment 14 may be combined to provide various agricultural systems 16. In some embodiments, the combination may include a vehicle 12 and multiple pieces of equipment 14. For example, the combination may include a tractor, a seeder, and an air cart. In some embodiments, one vehicle 12 (e.g., tractor) may be used with multiple pieces of equipment 14 (e.g., seeders, tillers, harvesters, etc.) that may be coupled with the vehicle 12 to perform various agricultural operations.

In various examples, the one or more agricultural vehicles 12 and/or pieces of equipment 14 may be used at one or more work locations (e.g., one or more farms). During operation, the one or more agricultural vehicles 12 and/or pieces of equipment 14 may have a demand for maintenance and monitoring thereof. As such, to monitor each of the one or more agricultural vehicles 12 and/or pieces of equipment 14, a set of machine data may be collected and/or generated by each of the one or more agricultural vehicles 12 and/or pieces of equipment 14. In various examples, the set of output data can include operational data or conditions, default trouble codes (DTC), and/or data dictionary identifiers (DDI).

In several examples, the one or more of the vehicles 12 and/or the equipment 14 can include a data communication interface 18 that can include a first data communication network and/or a second data communication network. The two data communication networks can be extended externally through a shared interface connector to provide a combined set of data from a vehicle 12 and equipment 14. By way of example, the first data communication network may be a CAN data bus 20, and the second data communication network may be a data network transceiver 22.

The CAN data bus 20 can be in the form of a linear bus in the case of which a multiplicity of different controllers for monitoring and controlling operating functions of the agricultural vehicle 12 and/or of a piece of accessory equipment 14 attached thereto can be connected to a central data line in parallel. In some instances, the CAN data bus 20 is in the form of an ISOBUS according to the ISO 11783 standard. The ISO 11783 standard specifies a serial data communication network for controlling agricultural and silvicultural utility vehicles, including associated ISOBUS-based accessory equipment 14.

The data network transceiver 22 may be communicatively coupled with one or more remote sites, such as a remote platform 24 that includes a remote server 26, via a network/cloud 28 to provide a set of output data and/or other information therebetween. In general, the remote server 26 may be configured as any suitable processor-based device, such as a computing device or any suitable combination of computing devices. Thus, in several embodiments, the remote server 26 may include one or more processors and associated memory configured to perform a variety of computer-implemented functions. As used herein, the term "processor" refers not only to integrated circuits referred to in the art as being included in a computer but also refers to a controller, a microcontroller, a microcomputer, a programmable logic controller (PLC), an application specific integrated circuit, and other programmable circuits. Additionally, the memory of the remote server 26 may generally be configured as memory elements including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory may generally be configured to store information accessible to the processor, including the set of output data and/or the set of defined data that can be retrieved, manipulated, created, and/or stored by the processor and instructions that can be executed by the processor, when implemented by the processor, configure the remote server 26 to perform various computer-implemented functions, such as one or more aspects of the image processing algorithms and/or related methods described herein. In addition, the remote server 26 may also include various other suitable components, such as a communications circuit or module, one or more input/output channels, a data/control bus, and/or the like.

The network/cloud 28 represents one or more systems by which the data communication interfaces 18 respectively coupled with any of the one or more vehicles 12 and/or the one or more equipment 14 that may communicate with the remote platform 24. The network/cloud 28 may be one or more of various wired or wireless communication mechanisms, including any desired combination of wired and/or wireless communication mechanisms and any desired network topology (or topologies when multiple communication mechanisms are utilized). Exemplary communication networks 62 include wireless communication networks (e.g., using Bluetooth, IEEE 802.11, etc.), local area networks (LAN), and/or wide area networks (WAN), including the Internet and the Web, which may provide data communication services and/or cloud computing services. The Internet is generally a global data communications system. It is a hardware and software infrastructure that provides connectivity between computers. In contrast, the Web is generally one of the services communicated via the Internet. The Web is generally a collection of interconnected documents and other resources, linked by hyperlinks and URLs. In many technical illustrations, when the precise location or interrelation of Internet resources is generally illustrated, extended networks such as the Internet are often depicted as a cloud (e.g., 28 in FIG. 1). The verbal image has been formalized in the newer concept of cloud computing. The National Institute of Standards and Technology (NIST) defines cloud computing as "a model for enabling convenient, on-demand network access to a shared pool of configurable computing resources (e.g., networks, servers, storage, applications, and services) that can be rapidly provisioned and released with minimal management effort or service provider interaction." Although the Internet, the Web, and cloud computing are not exactly the same, these terms are generally used interchangeably herein, and they may be referred to collectively as the network/cloud 28.

In various examples, the remote platform 24 may include the server 26, a data store 30, and/or any other practicable device. The server 26 may be one or more computer servers, each of which may include at least one processor and at least one memory, the memory storing instructions executable by the processor, including instructions for carrying out various steps and processes. The server 26 may include or be communicatively coupled to the data store 30 for storing the set of output data, the set of machine data, and/or the set of defined data as well as for instructions for the one or more vehicles 12 and/or one or more of the equipment 14 with or without intervention from a user. Moreover, the server 26 may be capable of analyzing initial or raw data received from the one or more vehicles 12 and/or one or more of the equipment 14 and final or post-processing data (as well as any intermediate data created during data processing).

With further reference to FIG. 1, the server 26 also generally implements features that may enable the one or more vehicles 12 and/or the equipment 14 to communicate with one or more applications 32, which may be implemented within a user computing system 34. In general, the user computing system 34 may be configured as any suitable processor-based device, such as a computing device or any suitable combination of computing devices. Thus, in several embodiments, the user computing system 34 may include one or more processors and associated memory configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory of the user computing system 34 may generally be configured as memory elements including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory may generally be configured to store information accessible to the processor, including the set of output data and/or the set of defined data that can be retrieved, manipulated, created, and/or stored by the processor and instructions that can be executed by the processor, when implemented by the processor, configure the user computing system 34 to perform various computer-implemented functions, such as one or more aspects of the image processing algorithms and/or related methods described herein. In addition, the user computing system 34 may also include various other suitable components, such as a communications circuit or module, one or more input/output channels, a data/control bus, and/or the like. In several examples, the user computing system 34 may be a mobile device, tablet computer, laptop computer, desktop computer, watch, virtual reality device, television, monitor, or any other computing device or another visual device. The user computing system 34 can include an enterprise resource planning (ERP) platform. The ERP platform may be used to monitor the one or more agricultural vehicles 12 and/or pieces of equipment 14 within the fleet.

Additionally, communications from the applications 32, even though these communications may indicate one of the one or more vehicles 12 and/or the equipment 14 as an intended recipient, can also be directed to the server 26. The application 32 is generally any appropriate services or applications 32 that are accessible through any part of the network/cloud 28 and may be capable of interacting with the one or more vehicles 12, the equipment 14, the remote platform 24, and/or the user computing system 34.

In some examples, users can register the one or more vehicles 12 and/or the equipment 14 within their fleet through the user computing system 34 and/or through any other device. Registration of the one or more vehicles 12 and/or the equipment 14 may allow for a set of machine data, a set of output data, and/or a set of defined data to be transmitted from the one or more vehicles 12 and/or the equipment 14 to the user computing system 34. Additionally or alternatively, registration of the one or more vehicles 12 and/or the equipment 14 may allow the server 26 to communicate directly or indirectly with the one or more vehicles 12 and/or the equipment 14. According to some examples, the data communication interface 18 of the one or more vehicles 12 and/or the equipment 14 can be preconfigured at the time of manufacture with a communication address (e.g., a URL, an IP address, etc.) for communicating with the network/cloud 28 and may or may not have the ability to upgrade or change or add to the preconfigured communication address.

In several embodiments, an application interface 36 may be operably coupled with the network/cloud 28, the server 26, and/or the application 32. The application interface 36 may be configured to receive the output data and/or the defined data from the data communication interface 18 of the one or more vehicles 12 and/or the equipment 14 and provide the data, in the form of one or more objects, agents, lines of code, threads, subroutines, databases, or other suitable data structures, source code (human-readable), object code (machine-readable), to the user computing system 34. The application interface 36 can be implemented in hardware, software, or a suitable combination of hardware and software, and which can be one or more software systems operating on a general-purpose processor platform, a digital signal processor platform, or other suitable processors.

In various examples, the set of machine data may be generated by the one or more vehicles 12 and/or the equipment 14. In turn, a portion or all of the set of machine data may be transmitted as a set of output data from the vehicle 12 and/or the equipment 14 to the remote platform 24. In turn, the application interface 36 may allow the user computing system 34 to select a set of defined data, which may be a dataset that includes a portion or all of the set of output data for each of the one or more vehicles 12 and/or the equipment 14. For example, a first set of defined data may include all output data from the one or more vehicles 12 and/or the equipment 14. A second data may include a portion of the output data for a respective one or more vehicles 12 and/or the equipment 14. For instance, the user computing system 34 may select a first set of defined data affiliated with a first vehicle 12 that may include all output data for a defined time period, and a second data affiliated with a second vehicle 12 may include a portion of output data (e.g., fuel consumption, etc.) for the defined time period.

Once the set of defined data is selected for each of the one or more vehicles 12 and/or the equipment 14, the set of defined data may be provided to the user computing system 34 at the defined interval and/or upon request through the application interface 36. In various embodiments, the set of defined data may be provided from each of the vehicles 12 at intermittent or continuous times to the network/cloud 28. In some instances, the set of machine data generated by the one or more vehicles 12 and/or the equipment 14 may be selectively provided to the remote platform 24 as a set of output data for intermittent storage before transferring the set of defined data to the user computing system 34 through the application interface 36. In such instances, the remote platform 24 may store the set of output data until a request is made for a data transfer through the application interface 36. Additionally or alternatively, the remote platform 24 may store the set of output data and transfer the set of defined data through the application interface 36 based on one or more conditions, which may include a transfer period being reached, an accumulation of data threshold being reached, one or more of the vehicles 12 and/or equipment 14 being used for a defined period, and/or any other condition. Additionally or alternatively, the set of output data and/or set of defined data associated with the one or more vehicles 12 and/or the equipment 14 may be provided directly to the user computing system 34 through the application interface 36.

The user computing system 34 may be used to evaluate the set of defined data. In addition, one or more actions may be generated based on the set of defined data received. For example, the user computing system 34 may generate one or more notifications based on the set of defined data. The notifications may be in the form of a prescription map that is provided to the one or more vehicles 12 and/or the equipment 14 through the network/cloud 28 and/or to a remote electronic device. In addition, the notifications may be a work request order that is provided to the one or more vehicles 12 and/or the equipment 14 and/or the remote electronic device when one or more vehicles 12 and/or the equipment 14 are deemed to need repair.

In various embodiments, the set of machine data generated by the one or more vehicles 12 and/or the equipment 14 described herein may be combined with third-party data that may be converted into comparable data to be used independently or in conjunction with a set of machine data collected from the one or more vehicles 12 and/or the equipment 14. In various examples, the remote platform 24 may implement machine-learned methods and algorithms that utilize one or several machine learning techniques including, for example, decision tree learning, including, for example, random forest or conditional inference trees methods, neural networks, support vector machines, clustering, and Bayesian networks. These algorithms can include computer-executable code that can be retrieved by the server 26 through the network/cloud 28 and may be used to generate a predictive evaluation of the information of interest.

Figure 2:
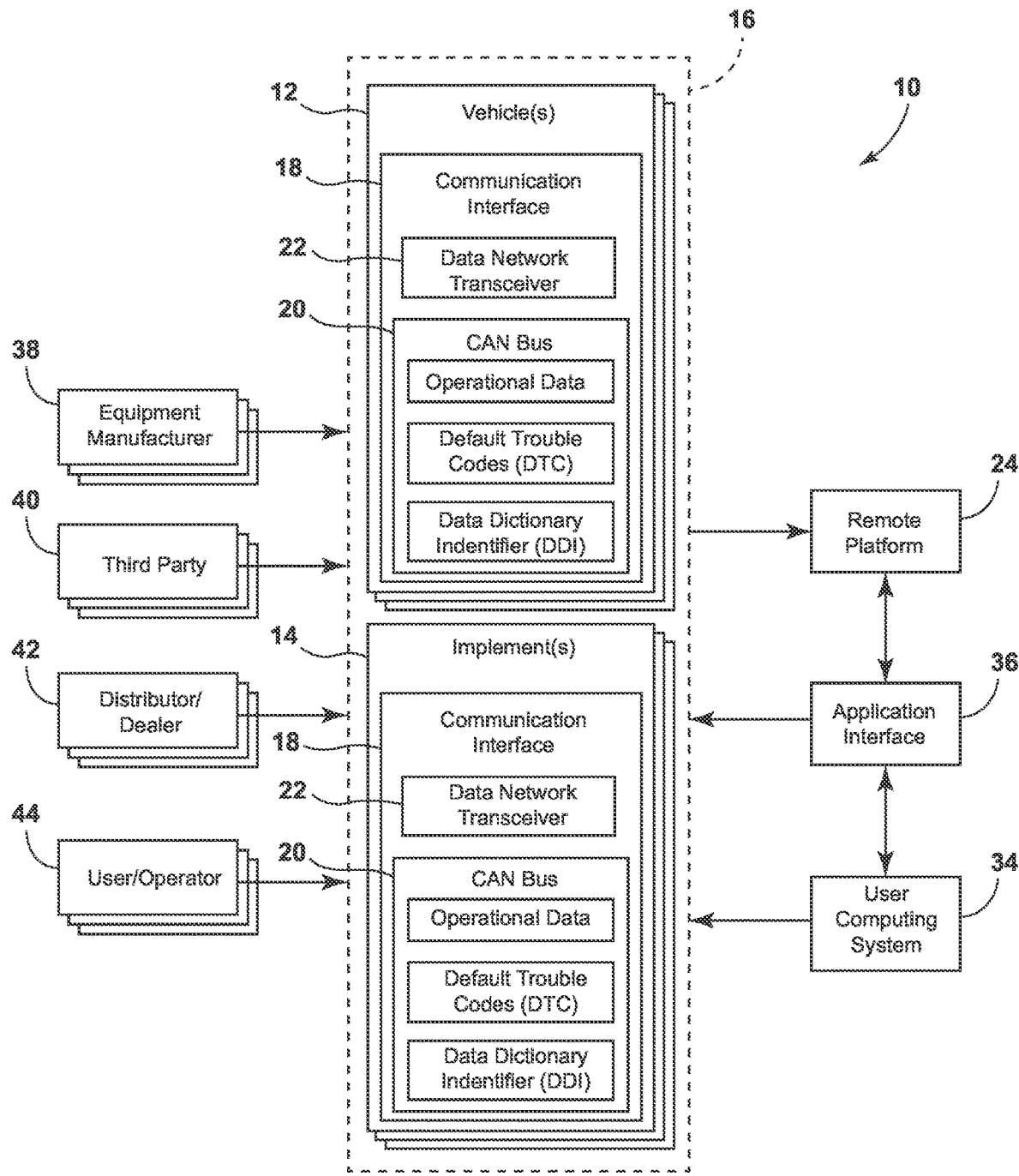
FIG. 2 illustrates a schematic view of an agricultural fleet operation system in accordance with aspects of the present subject matter.

Referring now to FIG. 2, a schematic diagram of the fleet operation system 10 is illustrated in accordance with various aspects of the present disclosure. As provided herein, the one or more vehicles 12 and/or the equipment 14 within the fleet operation system 10 may generate machine data that is provided to a respective communication interface 18 for each of the one or more vehicles 12 and/or the equipment 14. The communication interface 18 can provide the set of output data (e.g., a subset of the set of machine data) to the remote platform 24. In turn, some or all of the set of output data may be transferred through the application interface 36 to the user computing system 34 as a set of defined data that is selected through the application interface 36. However, in various examples, the one or more vehicles 12 and/or the equipment 14 may be capable of generating more sets of machine data than what is capable of being transferred to the remote platform 24 and/or to the user computing system 34. In such instances, various parties may be capable of determining the set of machine data to be transferred through the communication interface 18 as the set of output data.

In some examples, one or more equipment manufacturers 38 may define the set of output data from the set of machine data collected and/or generated by the one or more vehicles 12 and/or the equipment 14. The set of output data defined by the equipment manufacturer 38 may be a default configuration that may be based on the dimensions (e.g., length, width, height, etc.) of the piece of equipment 14, characteristics of the piece of equipment 14 (e.g., minimum turning radius, fuel efficiency, compatibility with other pieces of equipment 14), operating constraints (e.g., maximum speed, etc.), default settings, and other pieces of information about the vehicle 12 and/or the equipment 14.

One or more third parties 40 may also define the set of output data from the set of machine data collected and/or generated by the one or more vehicles 12 and/or the equipment 14. The third party 40 may be an aftermarket part manufacturer, a provider of software, a service provider, an organization, or any entity other than the equipment manufacturer 38.

Additionally or alternatively, a dealer/distributor 42 may define the set of output data from the set of machine data collected and/or generated by the one or more vehicles 12 and/or the equipment 14. The dealer/distributor 42 may have an inventory of agricultural vehicles 12 (e.g., tractors), pieces of equipment 14 (e.g., implements that may be towed by or carried by the vehicle 12) to be used with one or more agricultural vehicles 12, or agricultural systems 16 that include vehicles 12 and implements. The dealer/distributor 42 may also be capable of combining vehicles 12 and add-on equipment 14 to provide various agricultural systems 16 (e.g., tractor and implement) for the purchaser. In some embodiments, the combination may include a vehicle 12 and multiple pieces of equipment 14. For example, the combination may include a tractor, a seeder, and an air cart. In some embodiments, the purchaser may purchase one vehicle 12 (e.g., tractor) and/or one or more pieces of equipment 14 (e.g., seeders, tillers, harvesters, etc.) that may be coupled with the tractor in various agricultural systems 16 to perform various agricultural operations. The dealer/distributor 42 may assist the purchaser or equipment 14 owner in customizing the set of output data by altering the set of output data to reflect various agricultural systems 16, various options purchased, the specific uses of the equipment owner plans, maintenance/service history, etc. The dealer/distributor 42 may assist the purchaser in configuring purchased equipment 14 with previously purchased equipment 14 (or existing equipment 14 owned by the purchaser) or later-purchased equipment 14, for a term that may last weeks, months, years, the length of the purchaser's ownership, the life of the equipment 14, or some other amount of time.

In further embodiments, the user/operator 44 may define the set of output data from the set of machine data collected and/or generated by the one or more vehicles 12 and/or the equipment 14 without assistance from other parties such that set of defined data may be received by the user computing system 34.

As provided herein, the communication interface 18 may provide various forms of a set of output data to the remote platform 24 and/or the user computing system 34. For instance, the set of output data can include operational data or conditions, default trouble codes (DTC), and/or data dictionary identifiers (DDI). Based on the components of each vehicle 12, the set of output data that may be outputted may be unique (or common) between one or more of the vehicles 12 and/or the equipment 14 within the fleet. As such, the set of output data from the communication interface 18 may be selected from the set of machine data by the equipment manufacturer 38, third party 40, the dealer/distributor 42, and/or the user/operator 44. In various examples, the communication interface 18 may be capable of transmitting at least forty (40) data types, at least eighty (80) data types, and/or any other number of data types. The selected set of output data may then be provided to the remote platform 24 and/or the user computing system 34 in conjunction with the default trouble codes (DTC), and/or data dictionary identifiers (DDI). This data may be monitored on the user computing system 34 to evaluate any or all of the agricultural operations (or other operations) performed by the fleet.

In some examples, based at least in part on the set of output data, the remote platform 24 and/or the user computing system 34 may define the information that should be generated based on the configuration of the vehicle 12 and/or the equipment 14. In addition, the remote platform 24 and/or the user computing system 34 may generate a notification when the selected set of output data is within one or more defined ranges for a specific vehicle configuration and/or a specific equipment configuration. Additionally or alternatively, based at least in part on the set of output data, the remote platform 24 and/or the user computing system 34 may evaluate the set of output data and determine whether any additional errors are present. Further, in some cases, based at least in part on the set of output data and, possibly, agricultural data, the remote platform 24 and/or the user computing system 34 may generate one or more control actions, such as generating one or more prescription maps for one or more of the vehicles 12 and/or the equipment 14.

Figure 3:
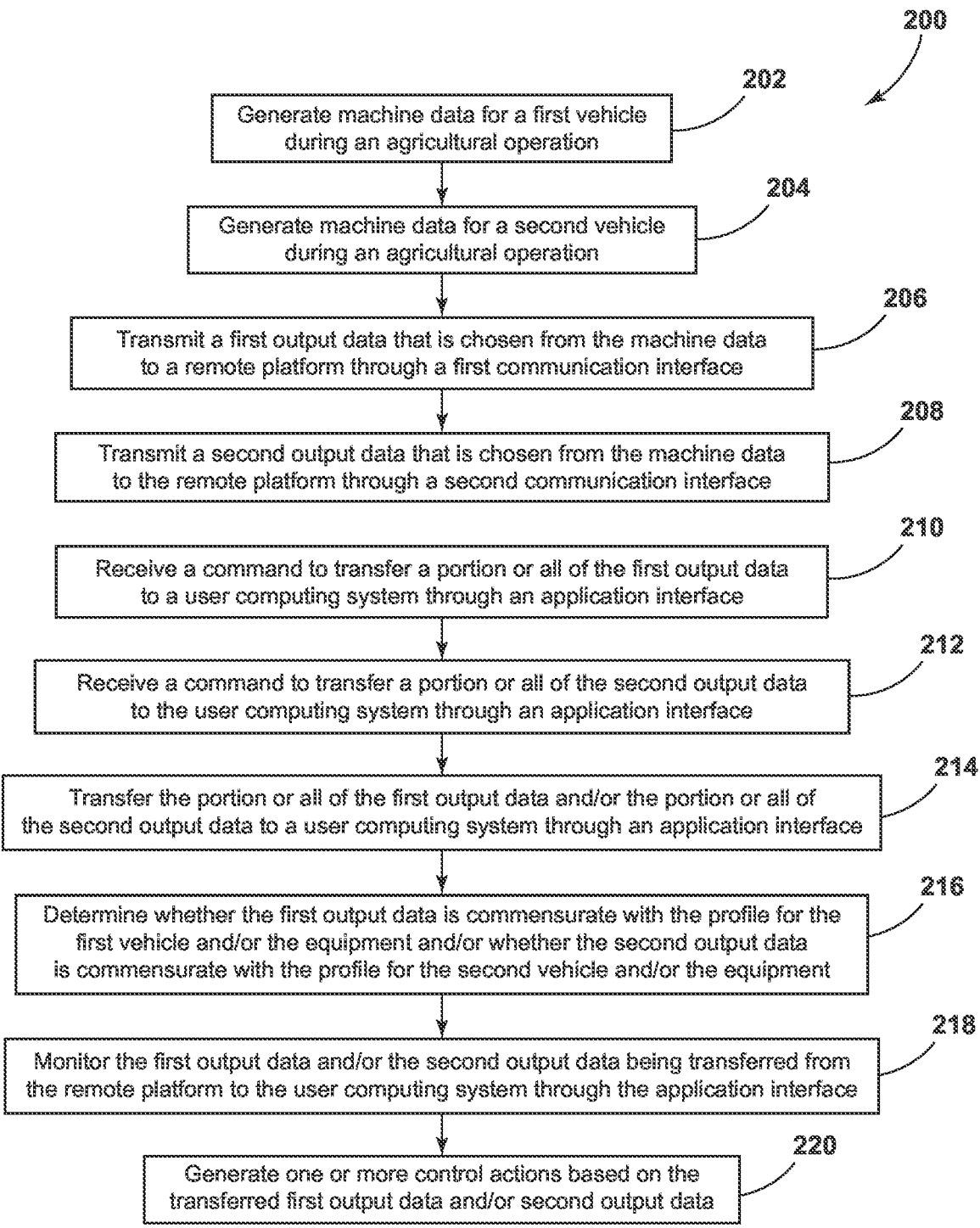
FIG. 3 illustrates a flow diagram of a method for operating a fleet operation system in accordance with aspects of the present subject matter.

Referring now to FIG. 3, a flow diagram of a method 200 for operating a fleet operation system is illustrated in accordance with aspects of the present subject matter. In general, the method 200 will be described herein with reference to the fleet operation system 10 and related components described with reference to FIGS. 1 and 2. It will be appreciated, however, that the disclosed method 200 may be implemented with fleets of vehicles 12 and equipment having any other suitable configurations and/or within systems having any other suitable system configuration. In addition, although FIG. 3 depicts steps performed in a particular order for purposes of illustration and discussion. The methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 3, at (202), the method 200 may include generating a set of machine data for a first vehicle during an agricultural operation. Similarly, at (204), the method 200 may include generating a set of machine data for a second vehicle during an agricultural operation.

At (206), the method can include transmitting a first set of output data that is chosen from the set of machine data to a remote platform through a first communication interface. Likewise, at (208), the method can include transmitting a second set of output data that is chosen from the set of machine data to the remote platform through a second communication interface. As provided herein, the first set of output data and/or the second set of output data can include operational data or conditions, default trouble codes (DTC), and/or data dictionary identifiers (DDI).

At (210), the method can include receiving a command to transfer a portion or all of the first set of output data to a user computing system through an application interface. Likewise, at (212), the method can include receiving a command to transfer a portion or all of the second set of output data to the user computing system through an application interface. At (214), the method can include transferring the portion or all of the first set of output data and/or the portion or all of the second set of output data to a user computing system through an application interface.

At (216), the method can include determining whether the first set of output data is commensurate with the profile for the first vehicle and/or the equipment and/or whether the second set of output data is commensurate with the profile for the second vehicle and/or the equipment. In some instances, the first set of output data and/or the second set of output data should be confined within defined ranges. In such instances, the user computing system and/or the remote platform may monitor the first set of output data and/or the second set of output data to confirm that the set of output data exists and/or is within the defined range.

At (218), the method can include monitoring the first set of output data and/or the second set of output data being transferred from the remote platform to the user computing system through the application interface. In such instances, the user computing system and/or the platform may be configured to detect various issues with the vehicle and/or the equipment based on the transferred first set of output data and/or the second set of output data.

At (220), the method can include generating one or more control actions based on the transferred first set of output data and/or second set of output data. As provided herein, the one or more control actions can include generating a prescription map (which may also be based at least in part on acquired agricultural and/or environmental data), a notification for a remote device, and/or instructions.

It is to be understood that the steps of any method disclosed herein may be performed by a computing system upon loading and executing software code or instructions that are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions that are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or instructions that influence the operation of a computer or controller. They may exist in a computer-executable form, such as vehicle code, which is the instructions and data directly executed by a computer's central processing unit or by a controller, or a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:
1. A fleet operation system comprising:
 a first vehicle configured to perform a first agricultural operation;
 a second vehicle configured to perform a second agricultural operation;

a remote platform comprising a server communicatively coupled with the first vehicle and the second vehicle, the server including an application interface;
a first communication interface operably coupled with the first vehicle, the first communication interface comprising a first CAN data bus and a first data network transceiver, the first CAN data bus configured to collect a first set of machine data generated by the first vehicle, and the first data network transceiver configured to transfer a first set of output data to a remote platform;
a second communication interface operably coupled with the second vehicle, the second communication interface comprising a second CAN data bus and a second data network transceiver, the second CAN data bus configured to collect a second set of machine data generated by the second vehicle, and the second data network transceiver configured to transfer a second set of output data to the remote platform; and
a user computing system operably coupled with the remote platform and configured to:
receive the first set of output data and the second set of output data from the application interface; and
generate a control action based on the first set of output data and the second set of output data, wherein the control action includes one or more notifications based on the first set of output data and the second set of output data.

2. The fleet operation system of claim 1, wherein the first set of output data includes all output data from the first vehicle and the second vehicle.

3. The fleet operation system of claim 2, wherein the second set of output data includes a portion of the output data for the first vehicle and the second vehicle.

4. The fleet operation system of claim 1, wherein the first set of output data is affiliated with the first vehicle and includes all output data for a defined time period.

5. The fleet operation system of claim 1, wherein the second set of output data is affiliated with the second vehicle and includes a portion of the second set of output data for a defined time period.

6. The fleet operation system of claim 5, wherein the second set of output data includes fuel consumption data of the second vehicle during the defined time period.

7. The fleet operation system of claim 1, wherein the one or more notifications includes a prescription map, and wherein the prescription may is received through the first communication interface.

8. A method for operating a fleet operation system performed by processors of a server, the method comprising:
generating a first set of machine data for a first vehicle during an agricultural operation;
generating a second set of machine data for a second vehicle during the agricultural operation;
transmitting a first set of output data that is chosen from the first set of machine data to a remote platform through a first communication interface;
transmitting a second set of output data that is chosen from the second set of machine data to the remote platform through a second communication interface;
receiving a command to transfer all of the first set of output data to a user computing system through an application interface;
receiving a command to transfer all of the second set of output data to the user computing system through the application interface;
transferring all of the first set of output data and all of the second set of output data to a user computing system through the application interface; and
generating one or more control actions for the first vehicle based on the first set of output data or the second set of output data.

9. The method of claim 8, further comprising:
transmitting default trouble codes (DTC) and data dictionary identifiers (DDI) associated with the first vehicle with the first set of output data.

10. The method of claim 8, further comprising:
determining whether the first set of output data is commensurate with a profile for the first vehicle; and
determining whether the second set of output data is commensurate with the profile for the second vehicle.

11. The method of claim 8, wherein the first set of output data and/or the second set of output data is confined within defined ranges.

12. The method of claim 11, wherein the user computing system is configured to monitor the first set of output data and confirm that the first set of output data exists or is within a defined range.

13. The method of claim 8, further comprising:
monitoring the first set of output data and the second set of output data being transferred from the remote platform to the user computing system through the application interface.

14. The method of claim 8, wherein the user computing system is configured to detect issues with the first vehicle based on the first set of output data or the second set of output data.

15. The method of claim 8, wherein the remote platform is configured to detect issues with the first vehicle based on the first set of output data or the second set of output data.

16. A fleet operation system comprising:
a remote platform comprising a server communicatively coupled with a first vehicle and a second vehicle, the server including an application interface;
a first communication interface operably coupled with the first vehicle, the first communication interface comprising a first CAN data bus and a first data network transceiver, the first CAN data bus configured to collect a first set of machine data generated by the first vehicle during an agricultural operation and the first data network transceiver configured to transfer a first set of output data to the remote platform, the first set of machine data varied from the first set of output data based on an input received by the remote platform; and
a user computing system operably coupled with the remote platform and configured to:
receive a set of defined data from the application interface based on the first vehicle and the second vehicle each being used for a defined period; and
generate one or more control actions for the first vehicle based on the set of defined data.

17. The fleet operation system of claim 16, wherein the one or more notifications includes a prescription maps for the first vehicle.

18. The fleet operation system of claim 16, further comprising:
a second communication interface operably coupled with the second vehicle, the second communication interface comprising a second CAN data bus and a second data network transceiver, the second CAN data bus configured to collect a second set of machine data and the second data network transceiver configured to transfer a second set of output data to the remote platform,
wherein the user computing system is configured to receive the second set of output data from the application interface.

* * * * *